United States Patent
Higashi et al.

[11] Patent Number: 6,122,573
[45] Date of Patent: Sep. 19, 2000

[54] VEHICLE CONTROL METHOD AND SYSTEM FOR USE IN AUTOMATIC DRIVING SYSTEM

[75] Inventors: Shinichi Higashi; Hiroshi Suzuki, both of Hiroshima-ken; Akira Takagi, Tokyo, all of Japan

[73] Assignee: Mitsubishi Heavy Industries, Ltd., Tokyo, Japan

[21] Appl. No.: 09/002,782

[22] Filed: Jan. 5, 1998

[30] Foreign Application Priority Data

Jan. 7, 1997 [JP] Japan .................................. 9-000783

[51] Int. Cl.$^7$ .................................................. G08G 1/042
[52] U.S. Cl. ................................ 701/23; 701/35; 180/167
[58] Field of Search .................................. 701/23, 25, 26, 701/213, 41; 340/902, 903, 904, 905, 996; 180/168, 167

[56] References Cited

U.S. PATENT DOCUMENTS

| | | | |
|---|---|---|---|
| 3,775,743 | 11/1973 | Carter | 340/905 |
| 4,361,202 | 11/1982 | Minovitch | 180/168 |
| 4,401,181 | 8/1983 | Schwarz | 180/168 |
| 4,962,457 | 10/1990 | Chen et al. | 701/200 |
| 5,267,173 | 11/1993 | Tanizawa et al. | 701/23 |
| 5,289,183 | 2/1994 | Hassett et al. | 340/904 |
| 5,493,291 | 2/1996 | Brüggemann | 340/905 |
| 5,815,825 | 9/1998 | Tachibana et al. | 701/23 |

FOREIGN PATENT DOCUMENTS

| | | |
|---|---|---|
| 0135740A2 | 4/1985 | European Pat. Off. . |
| 0299386 | 1/1989 | European Pat. Off. . |
| 0618557A1 | 10/1994 | European Pat. Off. . |
| 2539888 | 7/1984 | France . |
| WO 9501607 | 1/1995 | WIPO . |
| WO 9635196 | 11/1996 | WIPO . |

*Primary Examiner*—Tan Nguyen
*Attorney, Agent, or Firm*—Birch, Stewart, Kolasch & Birch, LLP

[57] ABSTRACT

A vehicle control method for use in an automatic driving system which transmits drive support information stored in each of markers buried in a road at regular intervals, to a vehicle which passes the marker, in order to support driving of the vehicle, comprising the steps of storing, in the marker, positional information indicative of the position of the marker, and at least one of road information indicative of the state of the road and control information concerning the speed and traveling direction of the vehicle, and transmitting, to the vehicle, the positional information and the at least one of the road information and the control information, which are used as the driving support information.

22 Claims, 3 Drawing Sheets

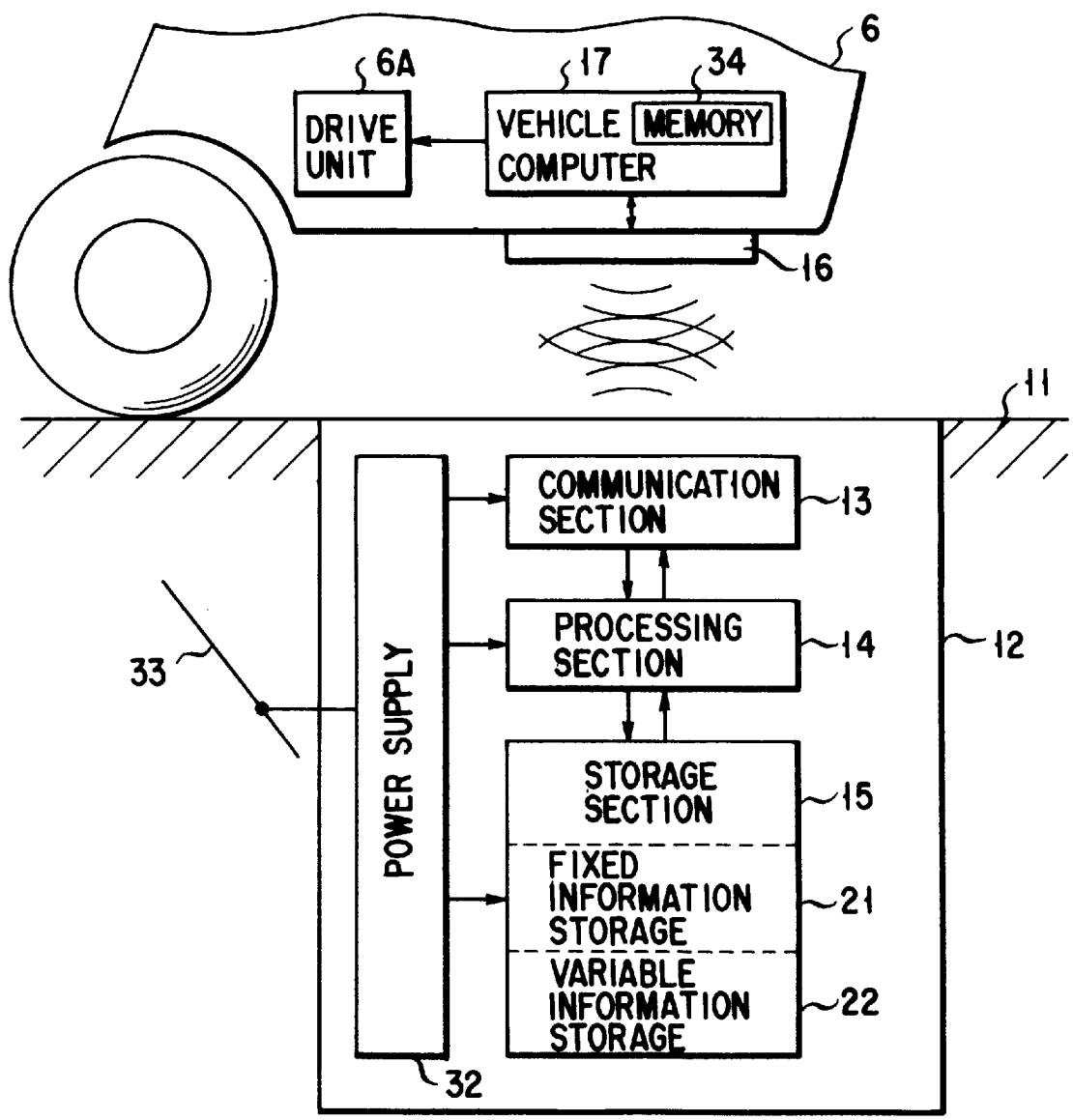
F I G. 2

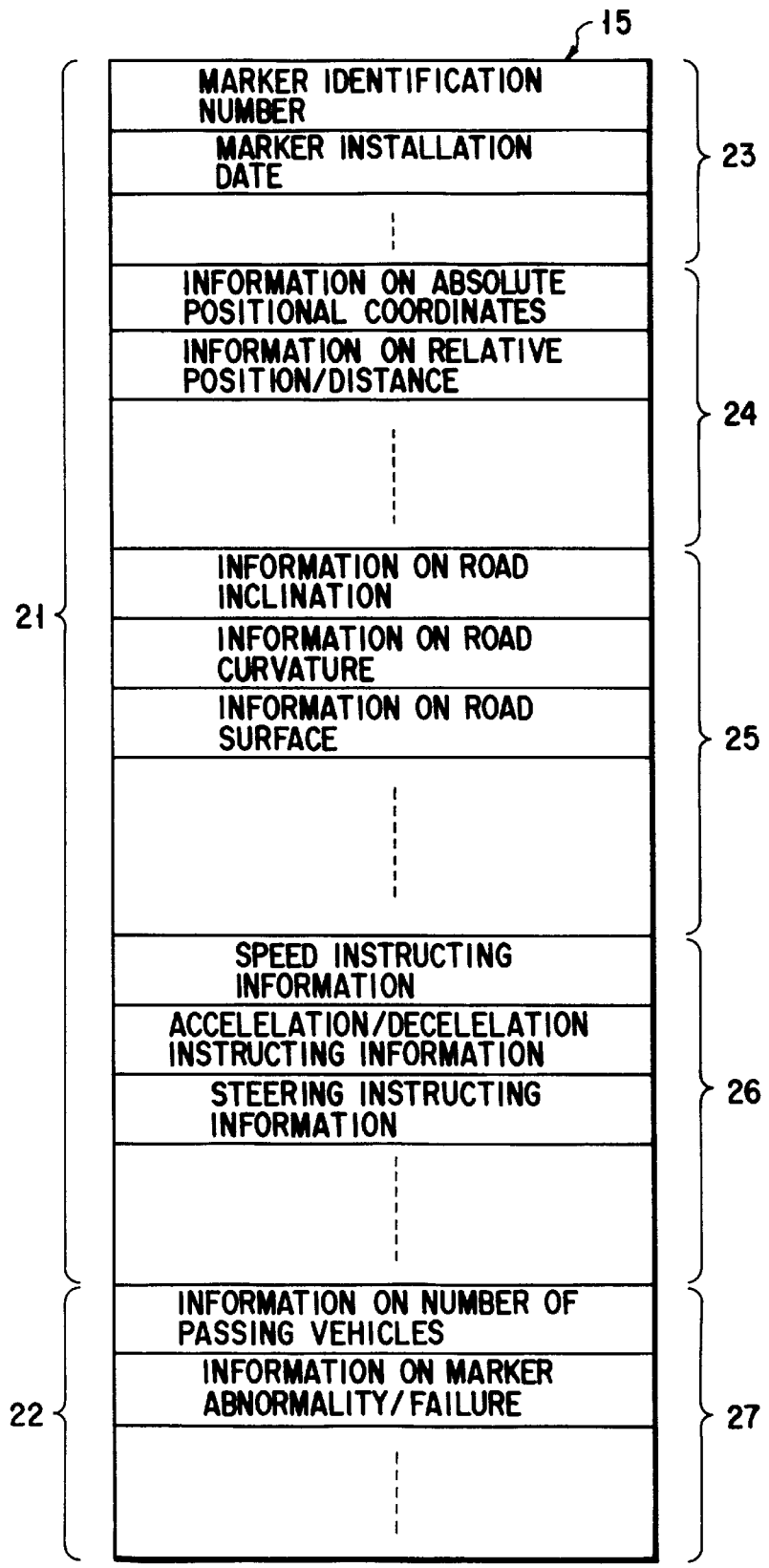
F I G. 3

VEHICLE CONTROL METHOD AND SYSTEM FOR USE IN AUTOMATIC DRIVING SYSTEM

BACKGROUND OF THE INVENTION

This invention relates to a vehicle control method and system for use in an automatic driving system.

To realize an automatic vehicle driving system, it is important to detect the position or speed of the vehicle.

In the conventional art, the vehicle position or speed is detected by means for directly converting the rotational speed of a wheel of the vehicle into a pulse signal to calculate the vehicle speed or the travelled distance, or means including a GPS (global positioning system) for determining the vehicle position using an artificial satellite, or means for transmitting absolute positional information stored in a marker buried in the ground, using transmission means such as a radio installation.

FIG. 1 is a conceptual view, useful in explaining the conventional automatic driving system, and showing a junction area on a highway 1. A minor road 3 meets a major road 2 at the junction. Markers 4 are buried at regular intervals along the center line of each of the major road 2 and the minor road 3. Each marker 4 stores information concerning its location, and is disposed to transmit the information to a position above the road by, for example, radio. Further, monitoring cameras 5 are provided at regular intervals at the side of the highway 1.

A vehicle 6 which travels on the road has a communication device 16 on its bottom for receiving positional information from the markers 4, and an antenna 7 on its top for receiving a GPS radio wave from an artificial satellite 8. The vehicle 6 also has, if necessary, a measuring device 30 for measuring the vehicle speed, the travelled distance, etc. by converting the rotational speed of a wheel of the vehicle into pulses and counting them. The vehicle 6 further has a controller 31 including a computer installed in the vehicle. The positional information transmitted from the marker 4 and received by the communication device 16, the information transmitted from the artificial satellite 8 and received by the antenna 7, and the vehicle speed and the travelled distance measured by the measuring device 30 are input to the vehicle controller 31, which in turn drives the vehicle 6 based on the input information.

However, the conventional method for measuring the vehicle speed and travelled distance from the pulses indicative of the rotational speed of a wheel of the vehicle 6, and controlling the vehicle based on the measurement values is considered mere auxiliary means. This is because a slip may well occur between the road and the wheels of the vehicles when the vehicle speed abruptly changes or the surface of the road becomes less suitable for driving, which makes it difficult to accurately measure the vehicle speed or travelled distance.

Moreover, although the vehicle control method using the GPS and the artificial satellite 8 is effective for wide-range positioning, it cannot be used in a tunnel or between tall buildings yet. Therefore, this method cannot singularly establish an automatic driving system and hence is only used as auxiliary means.

In addition, the conventional vehicle control method using the marker 4 is used at a branchpoint or a junction of a highway as shown in FIG. 1, at which information indicative of the accurate speed of the vehicle 6 is required. Since the marker 4 stores only fixed information concerning the position of the marker-installed position, it is not used at any place other than the branchpoint or the junction. In other words, the conventional vehicle control method using the marker 4 can be used only for limited purposes.

Even when this method is used on a road other than at a branchpoint or a junction, it imparts only positional information to a traveling vehicle, and accordingly contributes neither to automatic driving control of the vehicle, nor to the maintenance of the road.

BRIEF SUMMARY OF THE INVENTION

It is the object of the invention to provide a vehicle control method and system for use in an automatic driving system, capable of supporting automatic drive of a traveling vehicle using markers, and obtaining information for the maintenance of a road from the markers.

To attain the object, there is provided a vehicle control method for use in an automatic driving system which transmits drive support information stored in each of markers buried in a road at regular intervals, to a vehicle which passes the marker, in order to support driving of the vehicle, comprising the steps of:

storing, in the marker, positional information indicative of the position of the marker, and at least one of road information indicative of the state of the road and control information concerning the speed and traveling direction of the vehicle; and transmitting, to the vehicle, the positional information and the at least one of the road information and the control information, which are used as the driving support information.

In the invention, each marker transmits, to a traveling vehicle, positional information and at least one of the road information and the control information, which are used as drive support information. As a result, the automatic drive of the vehicle is supported by the drive support information not only at a branchpoint/junction but also at other points on the road.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view, showing a marker section incorporated in an automatic driving system according to an embodiment of the invention; and FIG. 3 is a view, showing information stored in the marker section in the embodiment.

DETAILED DESCRIPTION OF THE INVENTION

Figure 1:
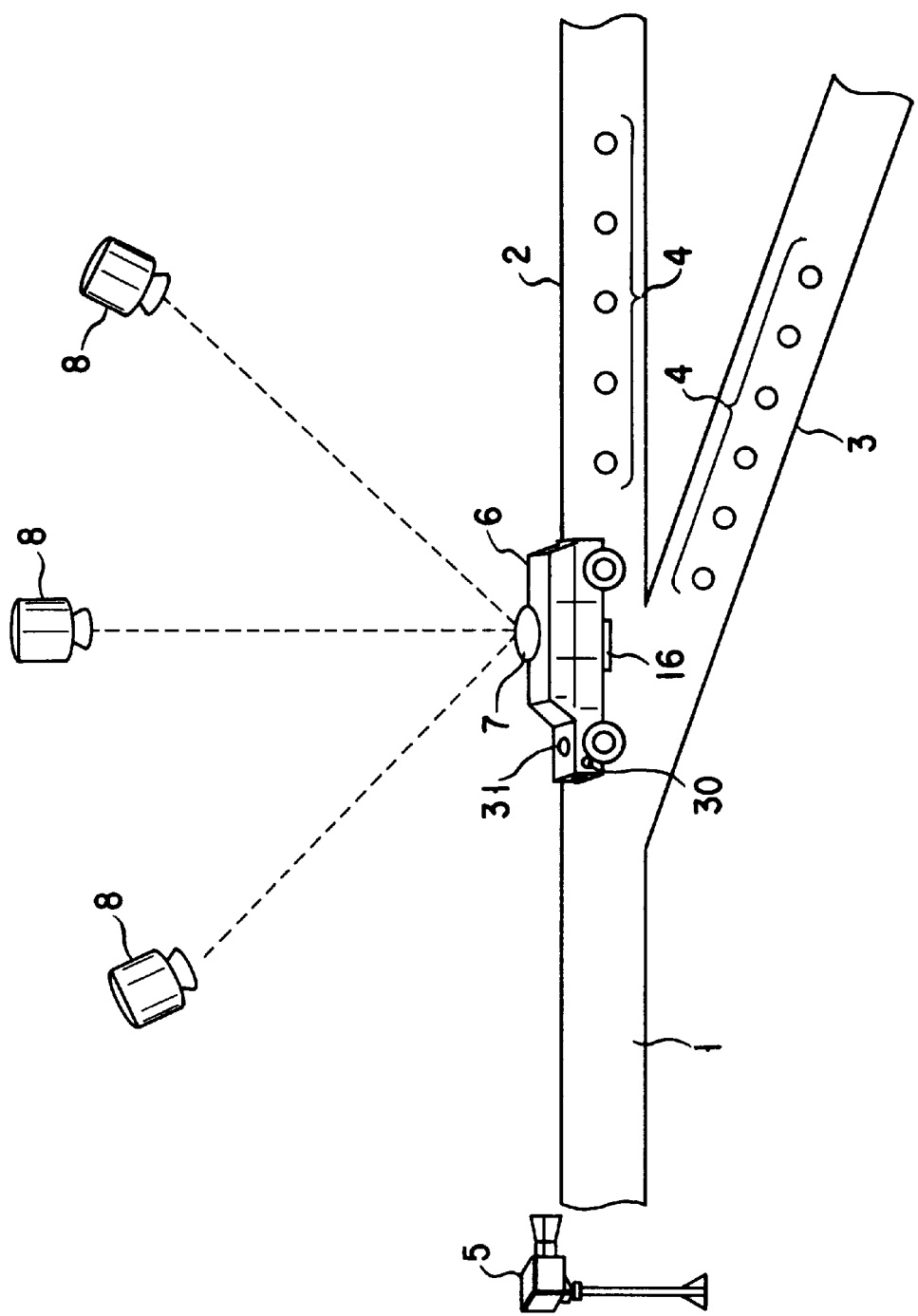
FIG. 1 is a conceptual view, showing the conventional automatic driving system.

The embodiment of the invention will be described with reference to the accompanying drawings.

FIG. 2 is a view, showing a vehicle and a marker section incorporated in an automatic driving system according to the invention. As is shown in FIG. 2, markers 12 are buried at regular intervals in center portions of a road 11 on which a vehicle 6 travels. Each marker 12 comprises a communication section 13, a processing section 14, a storage section 15 and a power supply section 32. AC power is supplied to the power supply section 32 from a power supply line 33 located, for example, along the road 11. The power supply section 32 rectifies AC power, and supplies a DC voltage as an operation voltage to the communication section 13, the processing section 14 and the storage section 15.

As is shown in FIG. 3, the storage section 15 includes a fixed information storage 21 consisting of, for example, an EEPROM storing information which does not need changing, and a variable information storage 22 consisting of, for example, a RAM storing information which needs changing.

Specifically, the fixed information storage 21 stores marker information 23 such as the identification number or installation date of the marker set in or outside the vehicle when the marker is buried; positional information 24 including information concerning the coordinates of the absolute position of the marker itself and information concerning the position of the marker relative to another one or the distance therebetween; road information 25 which includes information concerning the inclination, curvature, etc. of the road 11 and road surface information concerning the friction factor, shape, etc. of the road surface; and control information 26 which includes acceleration/deceleration instructing information for instructing the vehicle to accelerate, decelerate, stop, etc., and steering instructing information for instructing the traveling direction of the vehicle.

The variable information storage 22 stores maintenance information 27 which includes information concerning the number of vehicles having passed the marker, and information concerning abnormality, failure, etc. of the marker itself.

The vehicle 6 has a communication device 16 provided on its bottom such that it is opposed to the surface of the road, and a computer 17 provided therein as a vehicle controller. The computer 17 automatically controls the traveling of the vehicle 6 on the basis of information transmitted from the marker 12 and received by the communication device 16.

When in the above-described structure, the vehicle 6 passes the marker 12, the fixed information is read by the processing section 14 from the fixed information storage 21 incorporated in the storage section 15 of the marker 12, and transmitted to the communication device 16 via the communication section 13 by, for example, radio transmission. At this time, the processing section 14 reads the fixed information stored in the fixed information storage 21 in response to an instruction to read output from, for example, the vehicle computer 17 via the communication device 16.

The vehicle computer 17 controls the traveling of the vehicle 6 on the basis of information transmitted from the marker 12 and received by the communication device 16. More specifically, the computer 17 controls the traveling of the vehicle 6 by supplying a drive unit 6A with the fixed information transmitted from the marker 12 and received by the communication device 16, i.e. the positional information 24, the road information 25, and the control information 26.

Although the vehicle computer 17 performs traveling control of the vehicle 6 mainly based on the positional information 24 and the control information 26, it can also anticipate a change in the state of the road ahead on the basis of the road information 25 which includes information concerning the inclination or curvature of the road 11, and/or road surface information concerning the friction factor or configuration of the road surface. As a result, the traveling control of the vehicle can be performed smoothly.

On the marker 12 side, the processing section 14 calculates the number of occasions of communication between itself and vehicles 6 having passed it, and writes, into the variable information storage 22, the number of occasions of communication as the number of vehicles having passed it. Moreover, the marker 12 inspects itself using the processing section 14, and writes, into the variable information storage 22, information which indicates abnormality or failure of itself, if any, and is used as the maintenance information 27.

The information indicative of the number of passing vehicles and the information indicative of marker abnormality/failure can be obtained by periodically reading the information stored in the variable information storage 22 of the storage section 15, using, for example, an inspection car which travels along the road. From the inspected road surface conditions of each marker-buried point, whether or not the road needs maintenance work, or when the road should be repaired can be accurately estimated.

The inspection car is basically equipped with the communication device 16 and the computer 17 as in the case of the vehicle 6 shown in FIG. 2. When the inspection car passes the marker 12, the computer 17 transmits, via the communication device 16, an instruction to read maintenance information. When the marker 12 has received the maintenance information, the processing section 14 reads the maintenance information 27 from the variable information storage 22, as well as the fixed information such as the marker information 23, the positional information 24, the road information 25, the control information 26 which are stored in the fixed information storage 21, thereby transmitting the information to the vehicle 6 via the communication section 13. Then, the computer 17 in the vehicle stores, in a storage 34 incorporated therein, the marker information 23 and the maintenance information 27 transmitted from the marker 12.

As described above, the inspection car collects the maintenance information 27 of each marker 12 while traveling along the road 11. From the collected marker information 23, maintenance information 27, etc., the state of the road surface at the installation point of the marker can be determined, thereby precisely estimating if or when road maintenance work is or will be necessary.

As described in detail, in the invention, markers buried in a road at regular intervals each have a storage which stores marker positional information, road information including road inclination information, road curvature information, road-surface information, etc., and control information including speed instructing information, acceleration/deceleration instructing information, steering instructing information, etc., thereby transmitting, to each vehicle which passes the marker, the road information and control information as well as the marker positional information. As a result, the invention can support automatic drive not only at a branchpoint or a junction but also at other points on the road.

In addition, in the invention, the marker has a function for counting the number of vehicles which pass it, and a self-inspecting function, and the counted number of vehicles and information concerning failure or abnormality of the marker obtained as a result of self-inspection are stored in a storage and used as maintenance information. An inspection car, for example, can detect the state of the road surface at the marker installation point by periodically reading the maintenance information, which greatly contributes to estimation as to if or when road maintenance work is or will be necessary.

Additional advantages and modifications will readily occur to those skilled in the art. Therefore, the invention in its broader aspects is not limited to the specific details and representative embodiments shown and described herein. Accordingly, various modifications may made without departing from the spirit or scope of the general inventive concept as defined by the appended claims and their equivalent.

What is claimed is:

1. A vehicle control method for use in an automatic driving system which transmits drive support information stored in each of markers buried in a road, to a passing vehicle, in order to support driving of the passing vehicle, comprising the steps of:

storing, in the marker, positional information indicative of a position of the marker, and at least one of road information indicative of a state of the road and control information concerning a driving speed and traveling direction for passing vehicle; and transmitting, to the passing vehicle, the positional information and the at least one of the road information and the control information, which are used as the drive support information, wherein the marker counts the number of passing vehicles and stores, as maintenance information, information indicative of the counted number, and transmits the maintenance information to an inspection vehicle.

2. A method according to claim 1, wherein the marker also obtains information indicative of abnormality and failure of the marker itself, and stores the information indicative of the abnormality and failure as part of the maintenance information.

3. A method according to claim 1, wherein the road information includes at least information indicative of the inclination, the curvature and the surface state of the road.

4. A method according to claim 1, wherein the control information includes at least speed instructing information, acceleration/deceleration instructing information and steering instructing information.

5. A method according to claim 1, wherein the markers are buried in the road at regular intervals.

6. An automatic driving system for transmitting drive support information stored in each of markers buried in a road, to a passing vehicle, in order to support driving of the passing vehicle, wherein the marker includes storage means which stores positional information indicative of a position of the marker, and at least one of road information indicative of a state of the road and control information concerning a driving speed and travelling direction for the passing vehicle;

the marker also includes communication means for transmitting, to the passing vehicle, the positional information and the at least one of the road information and the control information, which are used as the drive support information wherein the marker further includes a processing section for counting the number of passing vehicles;

the storage means stores, as maintenance information, information indicative of the counted number; and the communication means transmits, to an inspection vehicle, the maintenance information stored in the storage means.

7. An automatic driving system according to claim 5, wherein the processing section also obtains information indicative of abnormality and failure of the marker itself; and the maintenance information includes the information indicative of the abnormality and failure.

8. An automatic driving system according to claim 6, wherein the road information includes at least information indicative of the inclination, the curvature and the surface state of the road.

9. An automatic driving system according to claim 6, wherein the control information includes at least speed instructing information, acceleration/deceleration instructing information and steering instructing information.

10. An automatic driving system according to claim 6, wherein the markers are buried in the road at regular intervals.

11. A method for use in a system which transmits drive support information stored in each of markers buried in a road, to a passing vehicle, in order to support driving of the passing vehicle, comprising the steps of:

storing, in the marker, positional information indicative of a position of the marker, and road information indicative of a state of the road;

transmitting, to the passing vehicle, the positional information and the road information, which are used as part of the drive support information;

counting, using the marker, the number of passing vehicles;

storing, in the marker, the counted number of passing vehicles; and transmitting, to an inspection vehicle which passes the marker, the counted number of passing vehicles.

12. The method according to claim 11, wherein the maker counts the number of passing vehicles by the number of occasions of communication with the passing vehicles.

13. The method according to claim 11, further comprising the steps of:

detecting, by the maker, abnormality and failure of the marker itself;

storing, in the marker, the detected abnormality and failure; and transmitting, to the inspection vehicle, the detected abnormality and failure as part of the maintenance information.

14. The method according to claim 13, wherein the control information includes speed instructing information, acceleration/deceleration instructing information and steering instructing information.

15. The method according to claim 11, further comprising the steps of:

storing, in the marker, control information concerning the speed and traveling direction for the passing vehicle; and transmitting, to the passing vehicle, the control information which is used as part of the driving support information.

16. The method according to claim 11, wherein the state of the road includes an inclination, curvature and surface condition of the road.

17. A system which transmits drive support information stored in each of markers buried in a road, to a passing vehicle, in order to support driving of the passing vehicle, wherein the marker includes:

a first memory location for storing positional information indicative of a position of the marker, and road information indicative of a state of the road;

a transmitter for transmitting, to the passing vehicle, the positional information and the road information, which are used as part of the drive support information;

a counter for counting the number of passing vehicles; and a second memory location for storing the counted number of passing vehicles, wherein said transmitter transmits, to an inspection vehicle, the counted number of passing vehicles.

18. The system according to claim 17, wherein the maker counts the number of passing vehicles by the number of occasions of communication with the passing vehicles.

19. The system according to claim 18, wherein the state of the road includes an inclination, curvature and surface condition of the road.

20. The system according to claim 17, wherein the maker further includes:

a detector for detecting an abnormality or failure of the marker itself; and a third memory location for storing the detected abnormality or failure, wherein said transmitter transmits, to the inspection vehicle, the detected abnormality or failure as part of the maintenance information.

21. The system according to claim 17, wherein the maker further includes:

a third memory location for storing control information concerning the speed and traveling direction for the passing vehicle, wherein said transmitter transmits, to the passing vehicle, the control information which is used as part of the driving support information.

22. The system according to claim 17, wherein the control information includes speed instructing information, acceleration/deceleration instructing information and steering instructing information.

* * * * *